(12) United States Patent
Yourst et al.

(10) Patent No.: US 7,496,735 B2
(45) Date of Patent: Feb. 24, 2009

(54) METHOD AND APPARATUS FOR INCREMENTAL COMMITMENT TO ARCHITECTURAL STATE IN A MICROPROCESSOR

(75) Inventors: Matt T Yourst, Vestal, NY (US); Kanad Ghose, Vestal, NY (US)

(73) Assignee: Strandera Corporation, Mountain View, CA (US)

( * ) Notice: Subject to any disclaimer, the term of this patent is extended or adjusted under 35 U.S.C. 154(b) by 150 days.

(21) Appl. No.: 10/994,774

(22) Filed: Nov. 22, 2004

(65) Prior Publication Data

US 2006/0112261 A1    May 25, 2006

(51) Int. Cl.
*G06F 9/30* (2006.01)
*G06F 9/40* (2006.01)
*G06F 15/00* (2006.01)
(52) U.S. Cl. .................. 712/218; 712/216; 712/217
(58) Field of Classification Search .................. 712/218
See application file for complete search history.

(56) References Cited

U.S. PATENT DOCUMENTS

| | | | | |
|---|---|---|---|---|
| 4,951,194 A * | 8/1990 | Bradley et al. | ............. | 711/132 |
| 5,179,702 A * | 1/1993 | Spix et al. | ............. | 718/102 |
| 5,560,032 A * | 9/1996 | Nguyen et al. | ............. | 712/23 |
| 5,717,883 A * | 2/1998 | Sager | ............. | 712/218 |
| 5,727,177 A * | 3/1998 | McMinn et al. | ............. | 712/218 |
| 5,751,985 A * | 5/1998 | Shen et al. | ............. | 712/218 |
| 5,771,377 A * | 6/1998 | Ando | ............. | 712/239 |
| 6,240,509 B1 * | 5/2001 | Akkary | ............. | 712/228 |
| 7,100,156 B2 * | 8/2006 | Archambault | ............. | 717/159 |
| 2004/0024993 A1* | 2/2004 | Parthasarathy | ............. | 712/218 |
| 2006/0059476 A1* | 3/2006 | McIntosh et al. | ............. | 717/155 |

OTHER PUBLICATIONS

Patel et al.; rePLay: A Hardware Framework for Dynamic Optimization; 2001; IEEE.*

* cited by examiner

*Primary Examiner*—Eddie P Chan
*Assistant Examiner*—Corey S Faherty (57) ABSTRACT

Method and hardware apparatus are disclosed for reducing the rollback penalty on exceptions in a microprocessor executing traces of scheduled instructions. Speculative state is committed to the architectural state of the microprocessor at a series of commit points within a trace, rather than committing the state as a single atomic operation at the end of the trace.

16 Claims, 8 Drawing Sheets

METHOD AND APPARATUS FOR INCREMENTAL COMMITMENT TO ARCHITECTURAL STATE IN A MICROPROCESSOR

CROSS REFERENCE TO RELATED APPLICATIONS

No relevant patents are co-pending.

BACKGROUND OF THE INVENTION

1. Field of the Invention

The present invention relates to computer microprocessors, and specifically to a method and apparatus by which a microprocessor transfers temporary speculative state to the user visible architectural state as instructions commit.

2. History of the Prior Art

Computer microprocessors are programmed with the assumption that each instruction completes and updates the user visible state of the processor (typically comprised of a plurality of registers and memory), also known as the architectural state, before the next instruction in the program executes. When instructions appear to the programmer to have executed in their original program order in this manner, the processor is said to exhibit sequential semantics.

To increase efficiency, modern microprocessors rearrange instructions out of program order when executing them, for instance to avoid stalling while waiting for an external memory access to complete, or to allow more than one instruction to execute at once. The process of executing an instruction is also referred to issuing it. Processors of the prior art typically dynamically schedule instructions out of order using hardware structures, such that a given instruction will only issue after all results it depends on have been generated. Processors may also issue instructions speculatively, such that instructions may issue before it is know if their execution is actually required (for instance, if the instruction resides along the path actually taken by a branch). Instructions may generate exceptions (for instance, by accessing an invalid memory address). The processor state comprised of results generated by instructions speculatively issued out of order is called the speculative state.

To preserve sequential semantics, the speculative state generated by a given instruction must not update the architectural state until it is known with certainty that the instruction should actually have been executed (i.e., it was executed along the path of branches actually followed by the program, and it generated no exceptions.) If the architectural state is updated prematurely, it will be impossible to recover from branch mispredictions, mis-speculations and exceptions, as the architectural state will have been corrupted by invalid data. Typically, microprocessors achieve sequential semantics by requiring all instructions to commit to the architectural state (i.e., update registers in the architectural register file and memory in the processor's caches) in their original program order, even if the actually issued out of order so as to complete faster. This ensures that the sequence of updates is identical to that generated by a processor executing all instructions in program order. This in-order commit is typically achieved using a reorder buffer (ROB), a structure familiar to those skilled in the art. Results are written to the ROB in the order in which they are generated but are read out and committed strictly in program order, as if reading from a queue.

The requirement that the results of instructions be committed to the architectural state strictly in program order is undesirable for several reasons. First, if the result of a given instruction is not ready, this instruction and all instructions after it in program order must wait for the not ready instruction to complete before the commitment process to continue. This constrains the throughput of the processor when the not ready instruction is for instance a load from memory, which may take a very long time to complete.

Second, the results of many instructions must be retained within the processor until they commit in program order, even if it is known that those results will never be used again by future instructions. This often greatly increases the internal resource requirements of the processor (for instance, physical registers, reorder buffers, store buffers and other structures known to those skilled in the art), increasing its complexity, decreasing performance and wasting electrical power.

Some microprocessor designs do not enforce sequential semantics by requiring instructions to commit strictly in program order. Instead, these designs use the concept of a trace, a sequence of instructions along a frequently executed and/or predicted path through the user program. Traces are comprised of a plurality of instructions including one or more operations that may change the control flow (path of execution through the program) and/or violate assumptions made in generating the trace, such as by causing an exception. These operations may include but are not limited to conditional branches, memory barrier operations, loads and stores that may cause memory related exceptions, et cetera. Instructions may be freely scheduled out of program order and/or executed speculatively within each trace so as to maximize performance, even if those instructions could cause exceptions or are along speculatively predicted branch paths, as will be appreciated by those skilled in the art. The Intel Pentium 4 microprocessor is an example of a design that arranges instructions into traces in the manner described; the instructions within each trace are then dynamically scheduled out of program order.

To ensure that speculative results do not contaminate the architectural state until they can be verified as correct, traces of the prior art typically have atomic semantics: at the successful completion of a trace (variously known as a commit point or checkpoint), all updates to the speculative state are simultaneously used to update the architectural state in one atomic operation. However, if any operation within the trace causes an exception or is found to be on the wrong branch path, the entire trace incurs a rollback, in which the speculative state is discarded and the processor returns to the last known good architectural state present before executing the trace. The processor then recovers from the rollback by performing an implementation specific recovery procedure, such as by executing each operation in its original program order until the excepting instruction is found or the correct branch path is resolved. A variety of methods may be used to separate the speculative architectural state from the committed last known good architectural state, and to update the committed state in one atomic operation. These methods are known from the prior art, for instance U.S. Pat. No. 5,958,061 (E. Kelly et al. Host microprocessor with apparatus for temporarily holding target processor state, September 1999) and U.S. Pat. No. 6,011,908 (M. Wing et al. Gated store buffer for an advanced microprocessor, January 2000).

An alternative paradigm in microprocessor design using the trace concept, called binary translation, takes a different approach to out of order execution. In a binary translation system, traces of instructions for a user instruction set are transparently translated to a different native instruction set composed of micro-operations (uops). These native code traces are then scheduled out of program order to improve performance and executed on simpler and faster processor hardware than would be possible if the hardware had to directly support the execution of user instructions. Each translated and scheduled trace is saved in a translation cache for immediate reuse at a later time in lieu of retranslating and rescheduling the trace every time it is encountered.

Typically the native hardware is in the form of a VLIW (Very Long Instruction Word) microprocessor core, which executes multiple independent uops per cycle by bundling them together and issuing one bundle per clock cycle. The VLIW processor core generally must be presented with a stream of uops already statically scheduled into bundles before execution; it does not dynamically reorder operations as they are encountered, as in a traditional out of order superscalar processor. The process of translating and/or scheduling uops into traces is typically done by a software layer written for the native uop instruction set, however this layer may also be implemented in a combination of hardware and/or software, as is described in U.S. Pat. No. 6,216,206 (G. Peled et al. Trace Victim Cache) and U.S. Patent Application 20030084270 (B. Coon et al. System and method for translating non-native instructions to native instructions for processing on a host processor, May 2003). In most microprocessors using binary translation in the context of a VLIW processor core, each trace is fully translated and statically scheduled before its first execution.

In a VLIW-based microprocessor using binary translation, atomic traces are typically implemented by encoding the final VLIW bundle in a given trace such that all speculative results accumulated during the execution of the trace are atomically committed to the architectural state at the time the final bundle completes execution.

Atomic traces can also be used in dynamically scheduled out of order processors. In *Out-of-Order Commit Processors* (A. Cristal et al., Intl. Symposium on High Performance Computer Architectures 2004), a mechanism is disclosed which allows results to commit out of program order. In this scheme, the architectural state is checkpointed at poorly predictable branches, and physical resources (physical registers, store buffers, et cetera) corresponding to a given result are freed when the corresponding architectural destination is overwritten in program order and when all known consumers of that result have issued (i.e., the result is said to be "dead"). H. Akkary et al. (*Checkpoint Processing and Recovery: Towards Scalable Large Instruction Window Processors*. IEEE Intl. Symposium on Microarchitecture 2003) present a similar approach to that of Cristal et al. but use different mechanisms, including the use of counters to track how many operations within each checkpoint are waiting to commit. Martinez et. al. (*Cherry: Checkpointed Early Resource Recycling in Out-of-Order Microprocessors*, IEEE Intl. Symposium on Microarchitecture 2002) present another checkpointing approach using shadowed architectural registers and a transactional data cache, similar to the '061 and '908 patents cited above. Hwu et al. (*Checkpoint repair for high-performance out-of-order execution machines*. IEEE Trans. on Computers 1987) present an overview of checkpointing techniques predating the above work.

Those skilled in the art will notice that the concept of a trace (atomic or otherwise) should not be confused with a thread. In the prior art, a thread comprises the flow of execution through a program as seen from the viewpoint of a single context (typically comprised of registers and memory locations). Multiple threads may be executed in parallel on a multi-threaded microprocessor providing a plurality of hardware contexts, or may be time-sliced by the operating system into a single hardware context. Unlike traces, threads are not bound to execute a specific subset of instructions from the program, and hardware threads may exist perpetually from the moment the processor is powered on. Certain microprocessors, such as the Intel Pentium 4, simultaneously utilize both traces and threads, wherein the continuous stream of instructions comprising each thread is itself divided into a plurality of traces at certain basic block boundaries, as defined above. In the Pentium 4, the instructions comprising each trace are decoded (as in binary translation) and written into a trace cache memory buffer prior to execution of each trace. Each trace is then executed by reading it from the trace cache and dynamically scheduling the constituent instructions out of program order. However, in the embodiment used in the Pentium 4 and similar designs, the traces are non-atomic, since every instruction within each trace is still committed in program order, rather than committing all or part of the trace at a single atomic checkpoint as described previously.

In all these approaches, the span of operations between any two checkpoints is considered an atomic trace and incurs a full rollback on any mispredict or exception, unlike the present invention. Additionally, even if a given result is dead, it must still occupy physical resources (i.e. registers and store buffers) within the processor core until its corresponding architectural destination is overwritten in program order. Furthermore, while operations from several checkpoints may be in the pipeline at any given time in the cited approaches, they cannot be intermixed such that they may fully execute and commit in parallel as with the present invention.

SUMMARY OF THE INVENTION

The use of the atomic traces of the prior art is wasteful, since a substantial number of otherwise correct computations will be wasted should a rollback occur. This forces the prior art to limit the length of traces so as to minimize the overhead of rollbacks. Unfortunately, short traces do not typically contain high levels of instruction level parallelism (ILP), in which the microprocessor executes multiple instructions per clock cycle. The present invention improves the performance of a trace based microprocessor by allowing traces to be non-atomic, such that the precise architectural state can be recovered at any branch misprediction or exception with far less overhead than the prior art's atomic trace approach.

DETAILED DESCRIPTION

Introduction

The present invention permits the establishment of one or more safe points of resuming execution when assumptions made in generating the trace are violated, and for resuming execution correctly from such a safe point within the trace, without the need to reprocess or re-execute instructions between the start of the trace and the point of resumption. Furthermore, the aforesaid execution resumes with the operations within the trace following the point of resumption, or from an alternate sequence of operations, depending on the manner in which the aforesaid assumptions were violated.

The present invention accomplishes such a non-atomic execution of traces by viewing each trace as a series of commit groups, wherein each commit group comprises a series of operations that compute or store a result, or verify that the aforesaid assumptions are valid in the course of execution. The execution of each commit group is atomic, and execution may be resumed immediately after the last commit group in sequence that completed successfully without violating the aforesaid assumptions. The present invention permits information on the generated results and commit groups to be maintained such that:

1. Operations belonging to different commit groups may execute in parallel and/or in a different order from the original program order of said operations;
2. Operations within each commit group will be atomically committed to the processor's state as if the operations within said group were executed strictly in program order;
3. Execution may correctly resume immediately following the last successfully committed group, as and when required;
4. Results established in the commit buffer for all other commit groups following the last committed group may be quickly discarded;

Definitions

In the present invention, traces of micro-operations (uops) are assembled along a frequently executed and/or predicted path through the user program. The selection uops within a trace may be determined in any number of ways known to the prior art. Traces of the present invention are composed of multiple commit groups. Each commit group consists of one or more basic blocks, with each basic block consisting of a linear stream of uops in program order terminated by any uop which may potentially cause a change of control flow (for instance, a conditional or indirect branch, trap uop, et cetera). Alternatively, a basic block may be terminated immediately before a uop that is likely to cause an exception.

Figure 1:
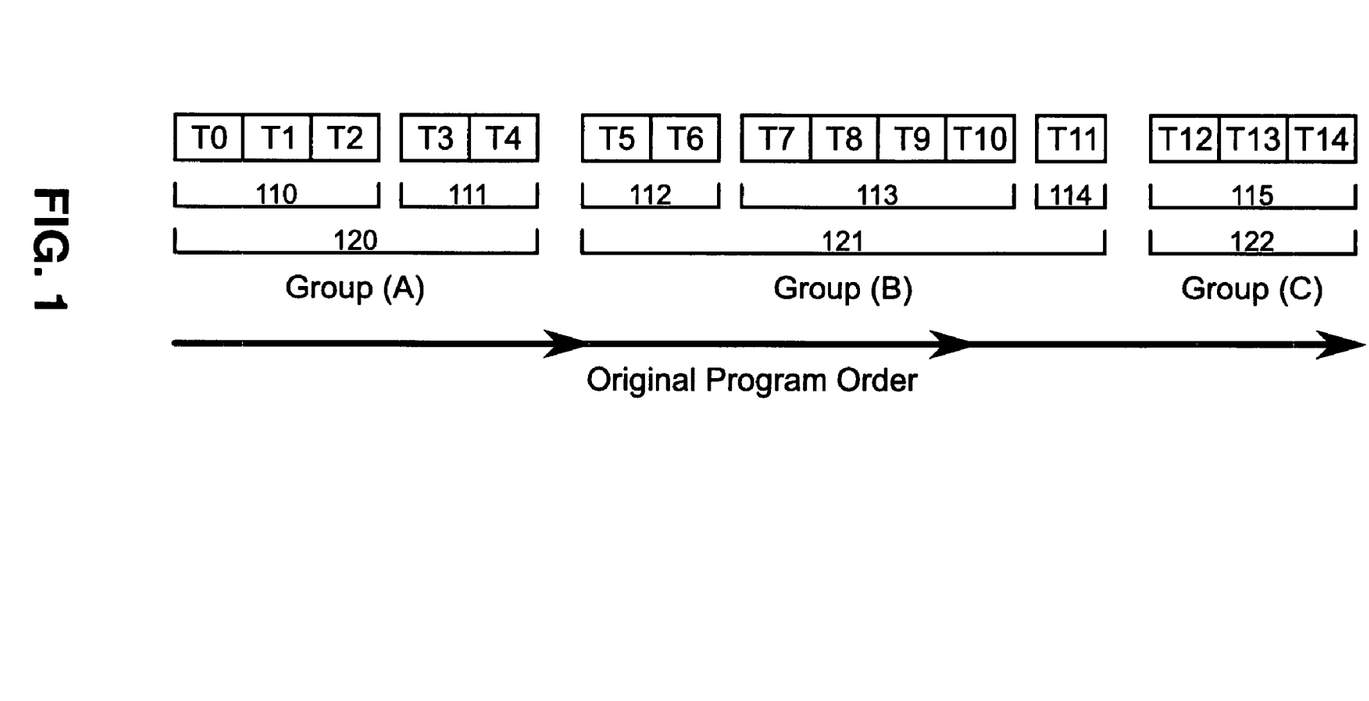
FIG. 1 shows an example trace comprised of a sequence of instructions in program order arranged into 7 basic blocks 16-21. These basic blocks are further arranged into 3 commit groups 22-24 known in the figures as groups (A), (B), (C).

FIG. 1 shows an example sequence of 15 uops composing a single trace. Each uop is labeled as Tn, where n is a sequential tag number denoting the original program order of the uop. In the present example, tags start at 0 and increment monotonically with each additional uop in the trace, yielding T0-T14. The uops are grouped into 7 basic blocks 110-115, with each basic block terminating at uops T2, T4, T6, T10, T11, T14, respectively. Furthermore, these 7 basic blocks have been placed into 3 commit groups 120 121 122, denoted as groups (A), (B), (C), respectively. Basic blocks 110 and 111 have been placed into group (A), basic blocks 112, 113, 114 are in group (B), and basic block 115 is alone in group (C). The commit group to which a given uop belongs is termed its home commit group.

Figure 2:
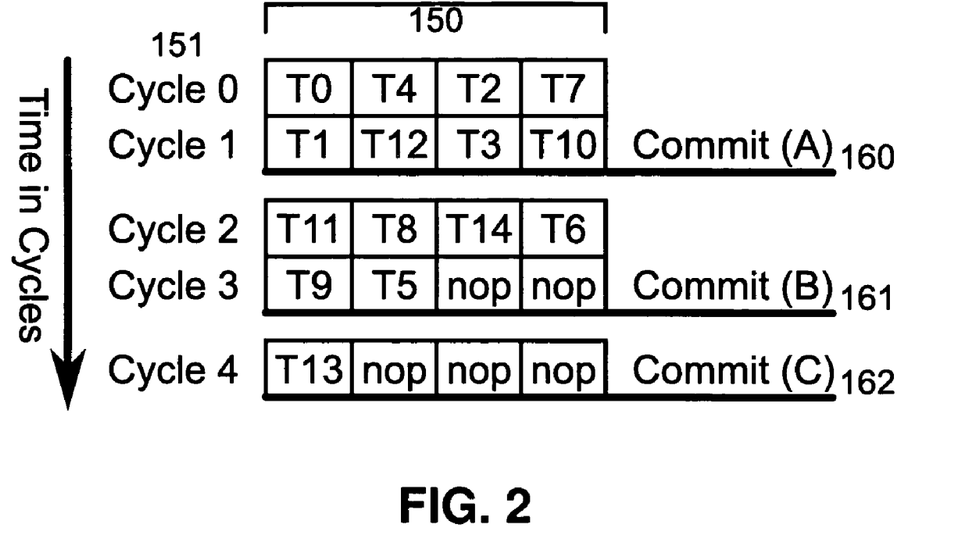
FIG. 2 depicts a typical schedule into which the instructions of FIG. 1 have been placed. The figure also denotes commit points within the scheduled trace.

FIG. 2 depicts a typical schedule into which the uops T0-T14 of FIG. 1 have been placed. The uops nave been rearranged out of program order so as to satisfy dependencies amongst uops. The concept of out of order scheduling will be familiar to those skilled in the field; the schedule of FIG. 1 may either be generated prior to execution and/or generated on the fly as uops execute. Each row 150 in FIG. 2 consists of a plurality of uops to execute in parallel, known as a bundle; column 151 denotes the cycle, relative to the start of the trace, in which the bundle is to issue. The grouping of uops into bundles may be done by scheduling the trace prior to execution, or alternatively by dynamic out of order scheduling hardware during execution. Each uop within each bundle 150 is identified by its tag T0-T14, in respect to the tags of FIG. 1. Each bundle may contain a mixture of uops from different home commit groups.

The commit point C for a given commit group G is the latest cycle in which any uop within G (or by extension, any groups in program order before G) appear within the schedule. In FIG. 2, for commit group (A), the latest uop to issue is T3, which issues in cycle 1. Therefore, the commit point 160 for commit group (A) occurs at cycle 1 as shown. This means that after the bundle executed in cycle 1 has completed, the results of all uops within and before group (A) have been committed to the user visible architectural state. There may also be unrelated uops for commit groups after (A) issued in the same cycle, such as T13 in group (C) and T10 in group (B). Additional commit points appear after cycles 3 and 4, for groups (B) and (C), respectively. In the present invention, commit groups always complete in their original program order, even if the constituent uops issue completely out of program order. The arrangement of basic blocks into commit groups is done such that only one commit group completes per cycle; if two or more basic blocks would complete on the same cycle, they would be collapsed into a single commit group.

At any given time, the processor is executing bundles within a specific currently executing commit group. For instance, in FIG. 2, the currently executing commit group during the first two bundles is commit group (A). After successfully passing the commit point 160 for group (A), the currently executing commit group advances to commit group (B).

If any uop assigned to the currently executing commit group violates the assumptions made in generating the trace, the entire architectural state must be restored to the last known good state that existed at the end of the last successfully committed group; this event is known as a rollback.

Hardware Facilities

The commit buffer design of the present invention allows updates to the architectural state within a given trace to be classified by commit group, since we may need to recover a specific version of the state (i.e., at the completion of a given commit group and by extension all groups before it), rather than the all-or-nothing approach of the prior art. The commit buffer comprises a plurality of slots. For any unique architectural destination A written with value(s) during commit group G, exactly one commit buffer slot S will be allocated to the uop(s) generating the corresponding value(s). Furthermore, slot S will only be written by the final uop in program order to write to A within group G; all other uops earlier in program order also targeting destination A within group G will not be allocated a commit buffer slot. The architectural destination may address any component of the architectural state, including but not limited to architectural registers, memory locations, special registers, et cetera. In the present invention, the commit buffer mechanism is implemented as separate buffers, one for results targeting architectural registers, and another for stores targeting memory locations. However, these disjoint buffers need not be separate and can be unified into a single buffer.

The commit buffer supports a variety of operations, including but not limited to writing a value generated by one or more uop(s) into a slot, selection of a subset of slot(s) belonging to a given commit group, and verification of whether or not any slots in a specified state belonging to a given commit group exist in the commit buffer. Results generated by uops are moved to the commit buffer in accordance with the final write condition above, and are written into their corresponding commit buffer slots. The commit unit continually selects a subset of slot(s) assigned to the currently executing commit group G, and writes the values from these slots into a speculative version of the architectural state. When the commit point for group G is successfully passed (i.e., if no uops within group G generated an exception), the speculative version of the architectural state replaces the last known good version of the architectural state. At this point, the commit buffer begins processing slots within the next commit group as described. If exception(s) are detected within group G, the speculative architectural state and contents of the commit buffer are discarded, rolling back the user visible architectural state to its last known good version.

As previously described, any violation of the assumptions used in generating a trace will cause a rollback of the architectural state to the last known good state existing at the previous commit point. In the preferred embodiment, the aforesaid assumptions made in generating the trace may include but are not limited to: the actual conditional and indirect branch directions taken within the trace must match the predicted branch directions used to generate the trace; memory ordering relationships between loads and stores match the predicted ordering used to schedule the trace (the concept of load/store reordering and aliasing will be familiar to those skilled in the art); the true results of computations and memory operations match any speculated values assumed during trace generation; and no other data dependent exceptions (for instance, page faults, numerical overflows, et cetera) occur during trace execution. Any violation of these or other assumptions is considered an exception.

Because operations may be scheduled outside their home commit group and such operations may generate exceptions, a mechanism is required for detecting which commit groups contain invalid results. In a first embodiment, a plurality of bits, one per commit group, may be maintained. If any operation in a given commit group G causes an exception, the bit corresponding to group G is set. If and when group G becomes the currently executing commit group, the trace is aborted and the architectural state as of the previous commit point is retained as the last known good state. In an alternative embodiment, a field indicating the first commit group in program order to encounter an exception is maintained. If the currently executing commit group matches the said field, the architectural state is rolled back as described.

Asynchronous interrupts (for instance, timer interrupts, external device events, et cetera) may occur during the execution of a trace, however such interrupts generally do not require a rollback since they are the result of external events rather than errors within the trace itself. In the preferred embodiment, on receipt of an external interrupt, the processor will continue processing the current trace until reaching either the next commit point or the end of the trace, depending on the implementation. At that point the architectural state is consistent and the interrupt may be handled as needed before resuming the interrupted trace or executing another trace.

Figure 3:
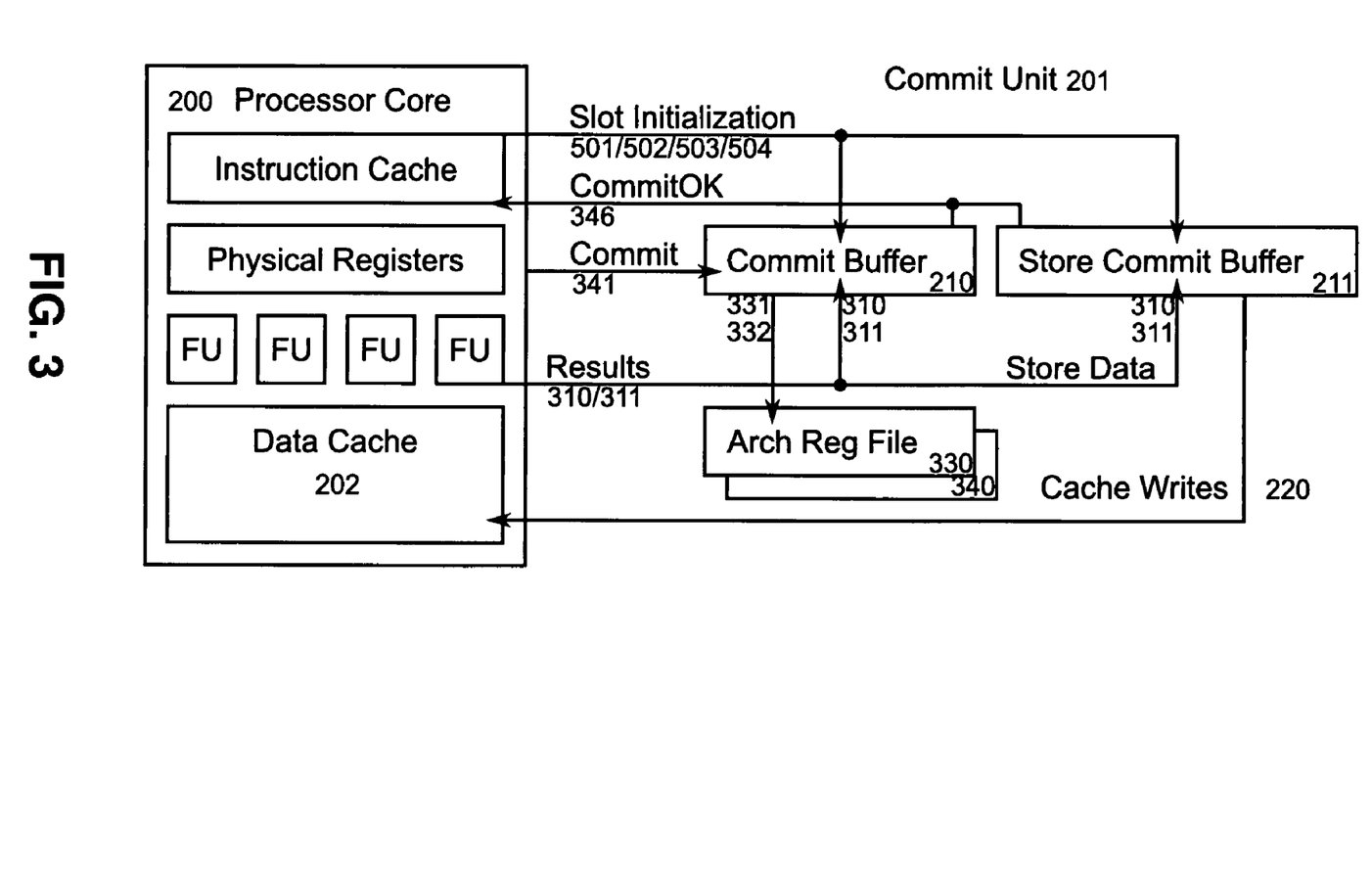
FIG. 3 shows the general structure of the microprocessor in the preferred embodiment

The microprocessor of the present invention is logically divided into two parts as illustrated in FIG. 3. The first part, the processor core 200 is responsible for performing all computations and is comprised of uop decode logic, physical register files, a plurality of functional units and caches 202. The structure of a typical microprocessor core will be familiar to those skilled in the art. The second part, the commit unit 201, is logically separate from the processor core and serves to isolate the management of the architectural state from the actual computations. The commit unit is comprised of the commit buffer 210, architectural register file 330, store commit buffer 211, and writeback interface to the data cache 220. Each of these components is described below.

Figure 4:
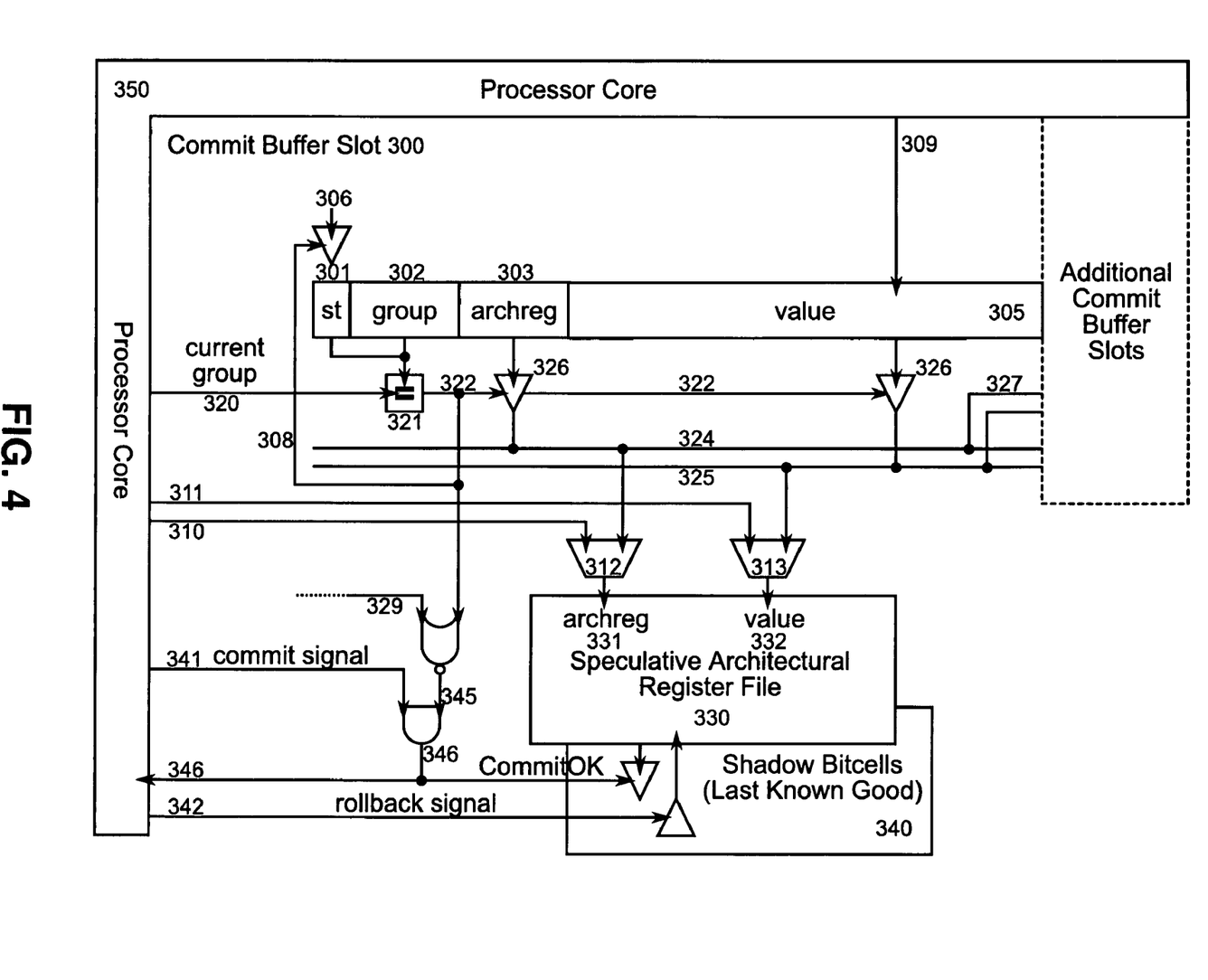
FIG. 4 shows the circuit level preferred embodiment of the commit buffer mechanism described in the present invention

FIG. 4 illustrates the structure of a commit buffer slot 300 in the preferred embodiment. Each slot in the commit buffer contains a plurality of fields, including but not limited to the current state of the slot 301, the commit group in which the result was generated 302, the architectural destination into which the result is eventually to be written 303 and the data to write 305. The state bitfield 301 holds the slot's current state from amongst the UNUSED, WAITING, READY and WRITTEN states, further described below and illustrated by the state machine of FIG. 7. The states a given slot can actually exist in may comprise a subset or superset of these states. The group 302 field holds the commit group to which a given result belongs. The archreg field 303 holds the architectural register to which the value should eventually be written, and the value field 305 holds the actual value to be written.

In one embodiment, the uop format (FIG. 5) includes of a plurality of bitfields 402-404 relevant to the implementation of the present invention. Additional bitfields 401 may be present to specify the operation, source and destination registers, et cetera as is common in many instruction sets; the number and meaning of these fields is not relevant to the present invention. The bitfields 401 shown in the diagram The group field 402 encodes the commit group to which the uop belongs. The archreg field 403 encodes the architectural register into which the uop's result is to be written. The cbslot field 404 specifies which commit buffer slot, if any, to write when the corresponding uop completes execution. To save space, the specific uop encoding may omit fields 402-404 in cases where no commit operation is to occur for a given uop. In an alternative embodiment, special commit uops, distinct from the uops generating the actual values to commit, can be scheduled into the trace to explicitly move each result into the assigned commit buffer slot at the appropriate time. Each commit uop C targeting an architectural register in group G is itself considered to be a member of group G and therefore C must issue before group G's commit point.

Figure 5:
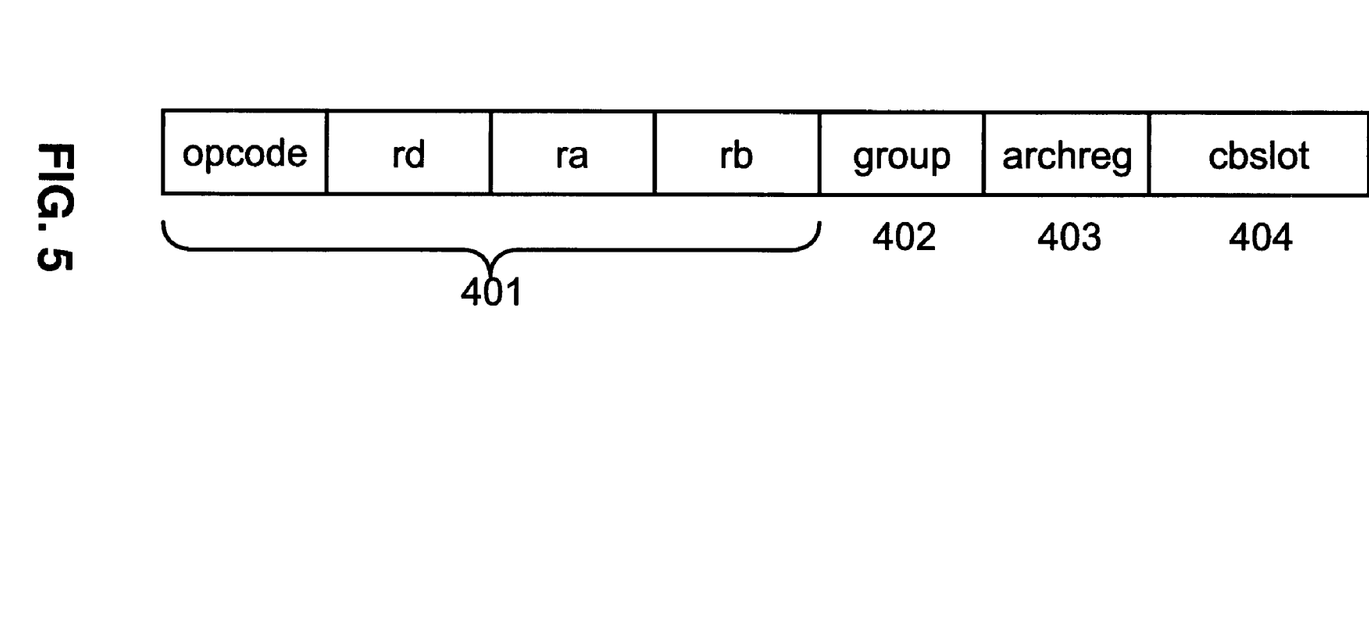
FIG. 5 shows a representative uop format capable of driving the features described in the present invention.

In an alternative embodiment, commit buffer slots may be assigned dynamically as the trace executes, rather than being explicitly specified by a cbslot field 404 associated with each uop designated to commit its result. In this embodiment, the cbslot field 404 is not needed; the processor hardware allocates any free slot in the UNUSED state in response to a uop designated to commit its result (for instance, by encoding a valid group and architectural register in the group 402 and archreg 403 fields, respectively). Methods for allocating free slots in register files and the like are well known to those skilled in the art; for instance, a free bitmap may be maintained and scanned for free commit buffer slots.

Figure 7:
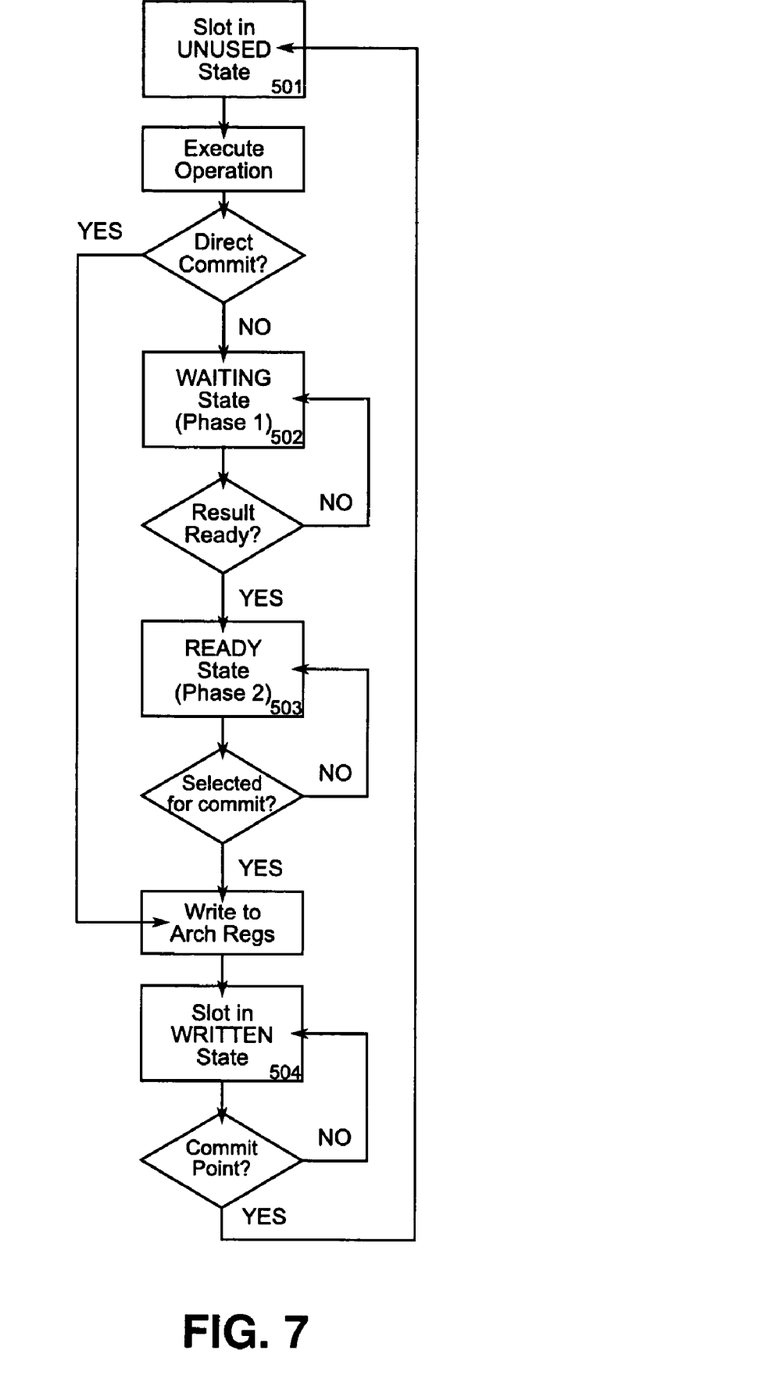
FIG. 7 shows the state machine of each commit buffer slot

In the preferred embodiment, for each uop U, updates to the commit buffer take place in two phases. The first phase occurs when U issues, as shown in FIG. 7. If the cbslot 404 field is set to any value other than a special null value, the commit buffer slot at the index specified by cbslot 404 is prepared for writing and U's group 402 and archreg 403 fields are copied into the corresponding fields 302, 303, 305, respectively, in the commit buffer slot. The commit buffer slot is then placed in the WAITING 502 state by writing to the state field 301 since U's result has not yet been written into the slot.

The second phase occurs when U's result actually becomes available. For variable latency operations such as loads, this may not happen immediately in the case of a cache miss. When U's result arrives, the result value 309 is routed from the processor core 350 into the designated commit buffer slot S 300 as specified by U's cbslot field 504. The incoming result 309 is latched into S's value field 305 and S's state field 301 is then updated to the READY 503 state. For a processor capable of generating n results each cycle, up to n write ports into the commit buffer would be needed. The flow of data from the processor core 100 into the commit buffer is strictly one-way (with exceptions discussed below), thereby completely removing the commit buffer from the critical path. Furthermore, hardware resources within the processor core assigned to a given result (for instance, physical registers, store buffers, et cetera) may be immediately freed and/or reused as soon as the last operation to consume the said result issues; the commit buffer retains the now unused result solely for eventual commitment to the architectural state.

Figure 8:
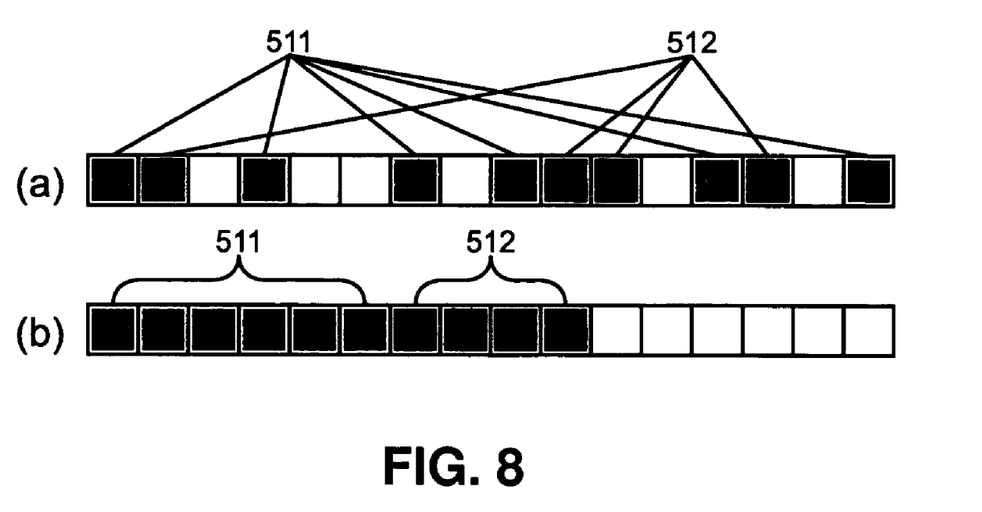
FIG. 8 shows two different methods for allocating commit buffer slots

Several mechanisms are possible for selecting a subset of slots assigned to the currently executing group for writing to the speculative architectural state. In a first embodiment, slots assigned to different commit groups are intermixed throughout the commit buffer. FIG. 8A contains an example of this configuration, with slots for two commit groups 511, 512, intermixed throughout the commit buffer. In this configuration, In FIG. 4, the number of the currently executing commit group 320 is broadcast to each slot 300 in the commit buffer. An equality comparator circuit 321 associated with each slot compares the broadcast group 320, the slot's group 302, and the slot's state. If the broadcast group 320 matches the slot's group 302 and the slot's state 301 is READY, the comparator 321 activates tristate buffers 326, thereby driving the slot's architectural destination 303 and value 305 onto commit buses 324 and 325, respectively. Since other commit buffer slots 327 may also feed into this common bus 324 325 on matches, it is assumed that logic ensures only one (archdest, value) pair is driven onto the buses 324 325 each cycle; first responder logic or a priority encoder could serve this role. In the preferred embodiment, a plurality of commit buses 324, 325 may be used to extract more than one result per clock cycle.

In a second embodiment, the commit buffer can be divided into multiple regions, such that all slots allocated to a given group occupy a contiguous range of slots within the commit buffer. This configuration is illustrated in FIG. 8B, where commit groups 511, 512 are arranged in adjacent regions at the start of the commit buffer. The commit unit can use the starting slot index and ending slot index for the region allocated to the currently executing group to select results to commit, in lieu of broadcasting the group identifier for associative matching. For example, all slots belonging to group 0 may be allocated to commit buffer slots 0-9, all slots belonging to group 1 may be allocated to commit buffer slots 10-15, and so on. The span of slots assigned to each group need not be contiguous; for instance, a plurality of regions may be specified to help reduce fragmentation when allocating commit buffer slots to each group. In the most extreme case, information indicating all commit buffer slots allocated to a given group may be provided. The commit buffer region(s) belonging to a given commit group may be communicated to the hardware by various means, for instance by special uops inserted at the beginning of a group. The number of slots allocated to a commit group G, and by extension the size of the corresponding region in the commit buffer, is equal to the number of unique architectural destinations written within the group G. If the processor is designed to support a total of R architectural registers and all registers are generally written within every group, an implementation may choose to always allocate R slots to each group so as to simplify the implementation.

In a third embodiment, a fixed number of commit buffer slots may be reserved for each commit group in the trace; for instance, in a processor with N architectural registers, N slots may be reserved for each commit group, even if some groups do not require all N slots. In this embodiment, the index of the commit buffer slot corresponding to a given architectural register R written within group G can be obtained through a hash function of R and G. The selection of commit buffer slots belonging to a specific group then becomes trivial. Other functions for fixed slot assignments are also possible.

In either of the above embodiments of the commit slot selection mechanism, the architectural register index driven onto the bus 324 is used to drive a write address select port 331 on a register file 330 storing the speculative architectural registers. Simultaneously, the value driven onto the bus 325 is used to drive a write data input port 332 on the same register file 330. After a given commit buffer slot has been successfully flushed to the speculative architectural register file 330, the slot transitions to the WRITTEN state so it is not rewritten. This is accomplished by latching the WRITTEN state 306 into the slot's state field 301. The bitline 308 tied to the match signal accomplishes this. In the preferred embodiment, a plurality of write ports 331, 332 attached to a plurality of commit buses 324, 325 may be used to extract and commit more than one result per clock cycle to the speculative architectural register file. Specifically, a processor capable of computing and accepting N results per cycle into the commit buffer should also be able to extract and write N results per cycle from the commit buffer into the architectural register file so as to maintain maximum throughput, assuming no results are eligible for direct commitment as described below.

In an alternative embodiment, the commit buffer may be divided into a plurality of banks, in which each bank requires only one commit bus 331, 332 as illustrated in FIG. 4. Each bank may also be restricted to one write port 309 for results entering the commit buffer. This may be desirable to reduce circuit complexity, power dissipation and clock cycle time. Since a given uop can potentially write to any commit buffer bank, and not all banks may have slots in the READY state waiting for commitment, mechanisms must be in place to balance the commit bandwidth across all commit buffer banks. Techniques for optimizing the performance of banked structures in microprocessors and avoiding bank conflicts will be known to those familiar in the art. For instance, it is possible to schedule uops such that bank conflicts will be avoided by design, or an arbitration mechanism can select a set of up to N non-conflicting writes to N separate banks each clock cycle.

If a given uop U within group G is scheduled to issue while G will be the currently executing group (i.e., U was not scheduled early in a commit group prior to G), there is no need to send U's result to the commit buffer, since it will immediately fall through into the architectural register file during the currently executing group. Instead, U's result bypasses the commit buffer and is directly written into the architectural register file in what is known as a "direct commit". In the preferred embodiment, this is accomplished by routing the value to write 311 and the destination architectural register index 310 to multiplexers 312 and 313, respectively. These multiplexers 312, 313 select between a normal commit request coming from the commit buffer (324, 325) and a fast commit request bypassing the commit buffer (310, 311). This direct commit mechanism cannot be used with variable latency results (i.e. loads) since the architectural register file 330 has no means of being updated later when the load data actually arrives, as in the second phase of the commit process described above. Only results that are always ready immediately after being generated (i.e. results of computations rather than memory accesses) and that are issued during their home commit group as described above may use the direct commit mechanism.

When the commit point for the currently executing commit group G is reached, the commit signal 341 is sent from the processor core to the commit unit. However, execution cannot safely proceed beyond the commit point and the processor must stall until all commit buffer slots assigned to the currently executing commit group 320 have been flushed to the speculative architectural register file 330 and are in the WRITTEN state. Several methods may be used for detecting that all commit buffer slots within group G are in the WRITTEN state.

In a first embodiment, the commit signal 341 and the currently executing group G to commit 320 are broadcast to all slots in the commit buffer. The match signals 322, 329 from all commit buffer slots are NORed together to assert the NoMatch signal 345 if and only if no slots belonging to group G and in any state other than the WRITTEN state exist in the commit buffer. The NoMatch signal 345 is ANDed with the commit signal 341 to form the CommitOK signal 346, which determines if the processor should pass the commit point or should stall.

In a second embodiment, an array of counters is maintained, with one SlotsAllocated counter corresponding to each commit group. For each commit group G, the corresponding SlotsAllocated counter is initialized to the total number of commit buffer slots allocated to group G; this initialization may take place at the start of the trace or any time prior to G's commit point. At the start of each commit group, a second counter, SlotsWritten, is reset to zero. When the currently executing commit group becomes group G, the SlotsWritten counter is incremented by one as each slot allocated to group G transitions to the WRITTEN state after being written to the speculative architectural register file. The SlotsWritten counter is compared to the SlotsAllocated counter corresponding to the currently executing commit group; when these two counters become equal, the speculative architectural register file is fully up to date. The CommitOK signal 346 is asserted to communicate this condition to the processor core, allowing it to continue execution.

After the CommitOK condition becomes true, all commit buffer slots corresponding to the group being committed are changed to the UNUSED state so they can be reused by subsequent commit groups. The current commit group 320 is incremented and all commit buffer slots belonging to the old group can be reused. However, the commit buffer may not be empty: there may still be other slots present associated with future commit groups. Finally, the speculative version of the architectural state atomically replaces the last known good version of the architectural state, as described below.

The commit buffer mechanism described in the present invention is not sufficient to ensure the precise last known good architectural state as of the previously passed commit point can always be restored. The direct commit mechanism described above allows values to constantly "fall through" the commit buffer into the speculative architectural register file 330 before it is known if all uops within the currently executing commit group will complete without exceptions. Similarly, commit buffer slots assigned to the currently executing group will also be continually flushed in the background to the speculative architectural register file 330. Therefore, the last known good architectural state present at start of the currently executing commit group must still be maintained and restored should the current group require a rollback. However, if direct commits are not allowed, and an alternative mechanism is in place for moving all commit buffer slots belonging to a given group into the architectural state in one atomic operation, the mechanism described below is not required.

In the preferred embodiment, the speculative architectural register file 330 utilizes shadowed bitcells 340 to hold this last known good state. On receipt of the CommitOK signal 346, all bitcells in the speculative architectural register file 330 are atomically latched into the shadow bitcells 340, overwriting the last known good state. On receipt of a rollback signal 342 from the processor core, all shadow bitcells 340 are latched back into the architectural register bitcells 330, restoring the precise state. This method is known from the prior art, as described in U.S. Pat. No. 5,958,061 (E. Kelly et al. Host microprocessor with apparatus for temporarily holding target processor state, September 1999)

In an alternative embodiment, the commit buffer itself may retain the last known good value of each architectural register. In this embodiment, a shadow map, comprising a plurality of pointers, may specify the commit buffer slot associated with the last known good copy of each architectural register from the commit group prior to the currently executing group. This set of last known good commit buffer slots indicated by the shadow map is retained until the currently executing group G successfully commits, at which point the shadow map is atomically updated to point to the commit buffer slots assigned to group G, freeing the previous set of last known good slots for reallocation. In the event of a rollback, the shadow map is used to copy the values from the last known good commit buffer slots back into the architectural state, effectively restoring the state to the last commit point.

Store Commit Buffer

The commit buffer described in the present invention is not limited to the commitment of results to architectural registers. For instance, it may also be used to maintain store operations to be written to memory. In this usage, a store commit buffer is used in a manner nearly identical to the register commit buffer described above. Unlike the register commit buffer, the architectural destination targeted by each store commit buffer slot is a memory address, not an architectural register, and store commit buffer slots matching the currently executing commit group are written into a speculative version of the memory hierarchy instead of a register file.

As described previously, only the final operation to write to a given architectural destination within a given commit group updates its assigned commit buffer slot. This same principle applies to the store commit buffer, wherein the architectural destinations are memory locations. Unlike operations targeting architectural registers, the specific memory location(s) targeted by a given store are not generally known until execution time, so it may not always be possible to know ahead of time which store is the last store in program order within a given group to target a specific memory location. The present invention assumes that traces are generated with a priori knowledge of which stores target all or part of the same memory location written by a previous store, thus allowing the final store within a given group targeting a given location to be identified. This knowledge may be acquired through profiling memory access patterns and relationships via methods known to the prior art. It is further assumed that a mechanism is in place for verifying that the store ordering assumptions made in generating the trace have not been violated during the execution of the trace; such mechanisms have also been described in the prior art, such as in U.S. Pat. No. 5,926,832 (M. Wing. et al. Method and apparatus for aliasing memory data in an advanced microprocessor, July 1999) and U.S. Pat. No. 5,799,179 (K. Ebcioglu et al. Handling of exceptions in speculative instructions, August 1998).

When a memory ordering violation is detected, the processor state is rolled back to the last known good state as of the last successfully passed commit point and corrective action is taken.

Because stores may typically write to a variable number of memory locations (for instance, 1, 2, 4, 8 bytes) and therefore one store may overlap some or all of another store, it is desirable to collect the data from a plurality of stores into a store composite buffer B associated with a given range of M memory locations; the microprocessor of the preferred embodiment comprises a plurality of such store composite buffers. Only the final store U in program order within a given commit group G to fall within the range a given store composite buffer B will cause all data composited to B to be moved into the store commit buffer slot S assigned to U in one operation.

In the preferred embodiment, the range of M memory locations associated with a given store composite buffer (and by extension the store commit buffer slot it is eventually written to) is contiguous, at least as large as the largest data type the microprocessor can store, and targets a memory address with an alignment equal to M. For instance, for a processor capable of storing 1, 2, 4, or 8 bytes, M may be 8 bytes in size and aligned to an 8 byte boundary, or may be size of an entire data cache line, or any other convenient size. Each store uop executed by the processor may specify the specific store composite buffer B to which the data to be stored is to be written.

Figure 6:
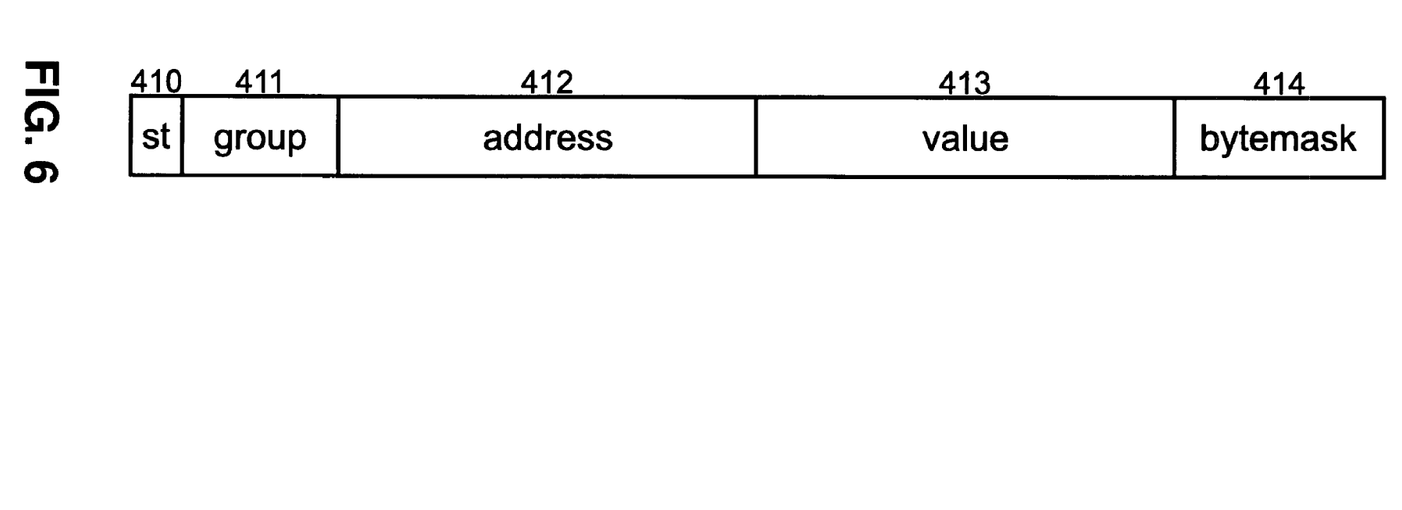
FIG. 6 shows the alternative commit buffer slot format for stores

FIG. 6 presents the format of each store commit buffer slot S in the preferred embodiment; additional fields not shown may be present. The state 410 and group 411 fields are analogous to fields 301 and 302, respectively, in the register commit buffer. The address field 412 holds the starting address of the range of memory locations associated with slot S. The value 413 field holds M bytes for all data composited in the store composite buffer written to slot S. The bytemask 414 field specifies a subset of bytes within the value field to be eventually written to memory; this specification is necessary since there is no guarantee that all bytes within the address range associated with S were actually written by stores. The concept of masked stores will be familiar to those skilled in the art.

If a given uop U is the final store to write to a given store composite buffer B within a given commit group G, U will write the contents of B into the group 411, address 412, value 413 and bytemask 414 fields of the store commit buffer slot S assigned to U. In accordance with the state diagram of FIG. 7, the slot S may immediately enter the READY state since the data to store is always ready at the time the store uop U executes. Thus, the two phase commit logic of the register commit buffer is not necessary. Through the direct commit mechanism described previously, stores executing within their home commit group can bypass the store commit buffer and directly commit to a speculative version of the memory.

In the preferred embodiment, slots in the store commit buffer belonging to the currently executing commit group are continuously written into a speculative version of the memory hierarchy. As with the register commit buffer, this speculative version of memory does not atomically replace the last known good version until the currently executing commit group successfully completes, for reasons described previously. A variety of methods known to the prior art may be used to atomically commit speculative changes to memory; for instance, U.S. Pat. No. 6,011,908 (M. Wing et al. Gated store buffer for an advanced microprocessor, January 2000).

In the preferred embodiment, described by J. Martinez et al. and the references therein, the processor may retain dirty cache lines within the data cache, and only allow those lines to update external memory after successfully committing the current group. In this embodiment, a rollback will invalidate any speculative cache lines, causing clean copies to be re-read from memory after the rollback. Alternatively, a victim cache may be used to store modified cache lines. Other embodiments are also possible, for instance those involving store buffers and queues, as is known to the prior art. Alternative embodiments may be required if the processor must preserve instruction set semantics requiring certain memory consistency or ordering models (for instance, strict store ordering, multiprocessor consistency, weak or lazy consistency, et cetera).

If the microprocessor of the present invention is to be used in a multiprocessor system, any speculative wires to memory must not be visible to other processors until the current commit group is committed. This constraint may be relaxed in an embodiment where multiple processor cores are placed on a single die or package (known as "chip multiprocessors" or "multicore processors" to those skilled in the art). In this case, speculative memory writes must be retained at the processor package boundary and not propagated to main memory until the group is committed. This approach allows all processor cores to share a speculative version of memory, with the results of stores only exiting the chip package when all cores reach a common commit point.

Scheduling Facilities

The method of grouping basic blocks into commit groups, identifying where commit points are to be inserted into the scheduled trace, and assigning commit buffer slots to operations may be implemented in software, hardware or a combination thereof. An algorithm for achieving these goals comprises but is not limited to the following general actions:

1. The trace is divided into basic blocks, wherein each basic block is numbered consecutively in program order and comprises a set of operations in program order terminated by any operation which may potentially cause a change of control flow or exception (for instance, a branch, trap, load, store, et cetera);
2. All operations in the trace are scheduled, potentially out of program order and/or across basic blocks, using any method known to those skilled in the art;
3. The commit point for each basic block is noted as the latest cycle (i.e. in time from the start of the trace) in which any operation within that basic block has been scheduled;
4. Sets of basic blocks with commit points falling in the same cycle are combined into a single commit group, wherein all operations within the said set of basic blocks will complete by the cycle in which the common commit point for the group appears;
5. If the number of commit points identified in accordance with (4) exceeds the number of commit points per trace permitted by the processor hardware, some commit points may be eliminated so as to fit within the stated hardware constraints.

6. Within each commit group, the final operation in program order to write to each unique architectural destination is identified and recorded as a committing operations;
7. For each committing operation identified in accordance with (6), a commit buffer slot is assigned to said operation and said operation is encoded so as to write to the assigned slot and/or directly to the architectural state.

The specific embodiment used to perform these tasks does not limit the scope of the present invention, so long as the output of the algorithm satisfies the conditions and requirements stated above. The preferred embodiment of the stated components is given below.

Commit Group Formation

The commit group formation algorithm is responsible for arranging basic blocks into commit groups and determining the cycles in the schedule where commit points should be inserted. The preferred embodiment of such an algorithm for consists of two passes as follows:

Pass 1 assumes that commit points need to be inserted into the schedule for every basic block in the trace, since the branch at the end of the block can mispredict and cause a rollback (all uops in program order after the branch may have been speculatively scheduled out of order and hence should not reach the architectural state). As previously described, the commit point for a basic block B is inserted at the latest cycle at which any uop within B has been scheduled. Two counters (AllocCount, SchedCount) associated with each basic block are used to detect when this occurs; an implementation supporting n basic blocks per trace will have n counter pairs. The first counter, AllocCount, is initialized to 1 when the first uop of a new basic block is seen in program order, and incremented for every additional uop in that block; essentially each AllocCount counter counts the number of uops in the corresponding basic block. The second counter, SchedCount, starts at zero and is incremented after each uop in the basic block is actually placed into the schedule.

The commit point for basic block B is inserted into the schedule at the cycle when the AllocCount and SchedCount counters for basic block B become equal, since all uops in the basic block B have been scheduled by this cycle. In practice, multiple basic blocks often have commit points at the same cycle; only the last basic block number in program order to complete at a given cycle is recorded as that cycle's commit point. This is how multiple basic blocks can be collapsed into a single commit group, as noted earlier. A collapse bitmap is maintained to track which basic blocks actually terminate a commit group (i.e., are recorded as the last basic block to commit in a given cycle). If two bits a and b are set in the collapse bitmap, this means that all basic block numbers between a+1 and b (inclusive) will belong to the same commit group.

Pass 2 processes each uop in the order in which it was scheduled, in contrast to Pass 1, where uops are considered in program order. This means processing each uop in the order listed within the first bundle, then the second bundle and so on. For each uop U in the scheduled trace, U's original program ordered basic block number is mapped to its final commit group number. Prior to beginning Pass 2, the collapse bitmap is scanned to create a mapping table for this process. If the first set bit in the bitmap is at bit index n, all basic blocks from block 0 to block n (inclusive) are mapped to commit group 0. Hence, entries 0 to n in the mapping table indicate commit group 0. The process is repeated for each subsequent commit group g by (1) shifting the bitmap over n+1 slots, (2) finding the new index n' of the next set bit in the shifted bitmap, and (3) setting all entries in the mapping table between n+1 and n' to indicate commit group g. The mapping table is fully initialized when the bitmap has no set bits remaining, indicating that all basic blocks have been considered. After the mapping table has been constructed, the basic block number B of each scheduled uop within the trace is used to index into the mapping table to return the corresponding commit group number G. This commit group number G and destination architectural register A are placed into the group field 402 and archreg field 403 of U's uop encoding.

Slot Assignment

As described previously, each uop U within commit group G targeting a given architectural destination A must only write to the commit buffer (or directly to the speculative architectural state if a direct commit is possible as described previously) if U is the final uop in program order within group G to write architectural destination A. Each uop meeting the condition described will be allocated a commit buffer slot and encoded to update that slot. As previously described, each uop in the trace is assigned a sequential tag number according to its position in the original program order. These tags are used only for scheduling purposes and are generally not required for processing in the microprocessor core or commit unit once a trace has been scheduled.

In the preferred embodiment, to determine which uops write to the commit buffer, an ordering table is maintained to map the key pair (G, A) to the tag T, where T is the latest tag in program order to update A within group G. The ordering table data structure may be a matrix of G rows and A columns, an associative structure (for a hardware accelerated implementation) or any other appropriate structure. The group G refers to the final commit group number as established by the two pass algorithm given above, or an equivalent algorithm. As each uop U is processed in program order, the ordering table slot (G, A) for U's group and architectural destination, respectively, is updated with U's tag. After processing all uops, the table reflects the correct update order.

In a final pass, all uops are processed in scheduled order as they appear in the scheduled trace. For each uop U, U's group G and destination architectural register A are used to read the ordering table slot (G, A). If the tag in slot (G, A) matches U's tag, U is the final writer in program order of architectural destination A within group G. In this case, an unused commit buffer slot S is allocated, subject to any additional constraints on the selection of commit buffer slots. U's cbslot field 404 is set to S, so as to cause the processor to write slot S with the result of U's operation.

However, if U has been scheduled to issue while its home group G will be the currently executing commit group, and U's result will be immediately available (rather than having a variable latency as with loads), and the ordering table slot (G, A) indicates that U is the final writer to A within group G, then U is eligible for direct commitment and will not be allocated a commit buffer slot. Direct commit is specified in the uop by encoding a special null value in U's cbslot field 404 such that the commit unit knows to directly route the result to the architectural register file 330 for writing, rather than writing the result into a commit buffer slot.

If the bundle currently being processed terminates a commit group G, all commit buffer slots corresponding to group G are freed and made available for reallocation. This is possible because the processor guarantees that all commit buffer slots for group G will have been committed to the architectural state (and thus reusable) by the time G's commit point is retired.

The algorithm described above can be applied to any class of architectural destination. For the architectural registers, the architectural destination A would be the architectural register index. For stores, the architectural destination A would be the physical address of the store.

Hardware Constraints

Specific embodiments of the processor hardware required to support multiple commit groups as described previously may place constraints on the commit group formation and/or slot assignment algorithms. In a first constraint, the hardware may support fewer commit groups per trace than the maximum allowed number of basic blocks per trace. Depending on the structure of the scheduled trace and the commit point placement, more commit points may be present than the hardware allows. In this situation, an algorithm may be applied so as to remove commit points until the aforementioned constraint is met. In one embodiment, closely spaced commit points (in terms of the number of cycles between the commit points) may be removed first, followed by additional removals of farther spaced commit points until the total number of commit points is under the hardware limit. Additional commit point removal policies are possible and are not limited to the stated algorithm. To remove a commit point C terminating basic block B in accordance with the commit point assignment algorithm described previously, bit B in the collapse map will be cleared and the basic block to commit group mapping table will be reconstructed as previously described.

In a second constraint, more commit buffer slots may be required than the commit buffer hardware can physically hold. In this situation, the commit point removal algorithm described above will be executed to reduce the number of commit points, thereby removing some of the unique (commit group, architectural destination) pairs each requiring a commit buffer slot. The commit buffer slot assignment algorithm described above will then be re-run with the reduced number of commit points. This process may be repeated to remove additional commit points until the aforementioned commit buffer size constraint is met.

Alternative Methods

Additional methods and algorithms beyond those discussed above may be used for both the grouping of basic blocks into commit groups and the assignment of commit buffer slots. For instance, an alternative embodiment may choose to insert commit points at regular or predetermined intervals within the sequence of basic blocks in program order within the trace.

What is claimed is:

1. An apparatus for use in a microprocessor that executes traces, a trace comprising the instructions contained in one or a plurality of basic blocks encountered along a specific control flow path through a program, wherein said apparatus is comprised of an analysis of said trace prior to the execution of any instructions within said trace, the apparatus further consisting of:

a step to divide said trace into a plurality of commit groups, wherein each commit group comprises one or a plurality of consecutive basic blocks in program order along said control flow path, and a step to identify and mark a specific subset of instructions within each commit group, this subset comprising only the instructions that perform the final write in the original program order to each unique architectural register or each unique memory location, such that a specific commit group can be committed to the architecturally visible state of the microprocessor only when commit groups preceding this said commit group in program order, if any, have been committed to the architecturally visible state of the microprocessor, and when the marked instructions in the said specific commit group have executed without errors or exceptions, where the commitment of any commit group consists of writing the results generated by only the said marked instructions in that commit group to the architecturally visible state of the microprocessor, but if a commit group cannot be committed, any of the results within this said commit group cannot be used to update the architecturally visible state, independent of previously committed commit groups within said trace, the said architecturally visible state comprising architectural registers, rename table registers, condition registers, control registers, memory locations or any combination thereof, and where the instructions within the said trace may be scheduled across a plurality of commit groups, by either static or dynamic means using any method of instruction scheduling known to those skilled in the art, and wherein said apparatus comprises one or a plurality of commit buffers, each containing a plurality of storage slots for temporarily holding results generated by said marked instructions within each commit group of said trace, wherein said commit buffers prevent stored results associated with a given commit group from updating the architecturally visible state until all other results associated with commit groups before the given group in the original program order have successfully updated said architecturally visible state, and if any of the said marked instructions within said group encountered errors, the said apparatus discards all results generated by instructions within said group and future groups, independent of previously committed commit groups within said trace, and wherein one or a plurality of facilities exist for directly writing the results generated by a directly committed subset of the instructions within a trace directly to the architectural state in lieu of writing said results to slots within one or a plurality of said commit buffers, wherein the said directly committed subset of instructions is comprised of instructions from the commit group following the last successfully committed group, and wherein one or a plurality of facilities are provided to restore the architectural state to the state existing as of the last successfully committed group in the event that one or a plurality of instructions in the said directly committed subset of instructions generates an error or otherwise violates assumptions made in generating the trace.

2. The apparatus of claim 1, with one or a plurality of facilities to associate each marked instruction from each commit group to a slot in the said commit buffer of claim 7 and one or a plurality of facilities that permit results of executed instructions to be written to their assigned slots.

3. The apparatus of claim 2, with one or a plurality of facilities for marking the state of each slot of one or a plurality of said commit buffers as ready or not ready, where ready signifies that the result(s) within said slot are complete and valid, and one or a plurality of facilities to determine when all slots assigned to instructions within a given commit group are in the ready state.

4. The apparatus of claim 3, with one or a plurality of facilities to identify and extract values stored in any slots assigned to a given commit group, wherein said commit groups are processed in a predetermined order.

5. The apparatus of claim 4, with one or a plurality of facilities to atomically commit said extracted values to structures for maintaining a consistent user visible architectural state only when all instructions within a commit group of claim 4 have completed without errors, wherein the aforesaid atomic commitment comprises transferring all results within the slots assigned to said commit group into the user visible architectural state in such a manner that all such updates to the architectural state become visible simultaneously.

6. The apparatus of claim 5, with one or a plurality of facilities to reset the state of one or a plurality of slots within a commit buffer of the apparatus of claim 5 to the not-ready state once the results stored in said slots have been transferred into the architectural state in accordance with claim 5.

7. The apparatus of claim 6, with one or a plurality of facilities to permit the microprocessor to establish an unambiguous state from which to resume execution after recognizing an exception or an interrupt, the said unambiguous state being the one established by the most recently committed commit group.

8. The apparatus of claim 7, with one or a plurality of facilities to discard any slots assigned to instructions in commit groups other than the most recently committed commit group within the said trace once a decision has been made to perform actions to service an exception or interrupt.

9. The apparatus of claim 8, wherein two physically separate sets of storage slots are employed, one set being used to hold results that target architectural registers and another set being used to hold results that target memory locations, and where results belonging to the same commit group from both sets of slots are jointly and atomically committed to the architectural state, and a facility for determining the final store instruction (as defined by the original program order within the scope of a given commit group) to write to a given memory address or range of addresses, using predictive or speculative means to determine the identity of said store instruction prior to the execution of the trace containing said store instruction.

10. The apparatus of claim 9, wherein the aforesaid commit buffer slots belonging to a specific commit group are located by means of facilities for associative addressing, or by means of facilities to directly generate the address of that slot through operations on some existing data values, or by means of a combination of these two aforesaid techniques.

11. The apparatus of claim 1, wherein the said marked instructions are identified as any and all of the instructions within each commit group that are the final instructions in program order within said commit group to perform updates to unique architectural destinations, said architectural destinations comprised of architectural registers, rename table registers, condition registers, control registers, or memory locations or a combination thereof.

12. The apparatus of claim 11, with one or a plurality of facilities for dividing the instructions in the trace into basic blocks, wherein the final instruction within each basic block may cause a change in control flow, and subsequently combining a plurality of basic blocks into a plurality of commit groups.

13. The apparatus of claim 12, with one or a plurality of facilities for defining the commit point of a given commit group as the latest time in cycles during which any instruction within said commit group has been scheduled for execution.

14. The apparatus of claim 13, with one or a plurality of facilities for combining a plurality of commit groups into a single commit group, such that all instructions within the said commit groups will execute by the cycle in which a common commit point appears, where such combination may be done for any reason including but not limited to satisfying scheduling constraints, eliminating redundant commit points that all fall on the same cycle, limiting the number of commit points, limiting the number of required storage slots to any limits imposed by the processor hardware or software, or any combination of hardware and software.

15. The apparatus of claim 14, with one or a plurality of facilities for assigning one or a plurality of storage slots in one or a plurality of said commit buffers to each of said marked instructions.

16. The apparatus of claim 15, with one or a plurality of facilities for encoding each marked instruction in accordance with the apparatus of claim 15 such that the said instruction writes to its assigned commit buffer slot or directly to the architectural state.

* * * * *